(No Model.)
C. BAUMGARDNER.
COOKING VESSEL.
No. 532,226. Patented Jan. 8, 1895.
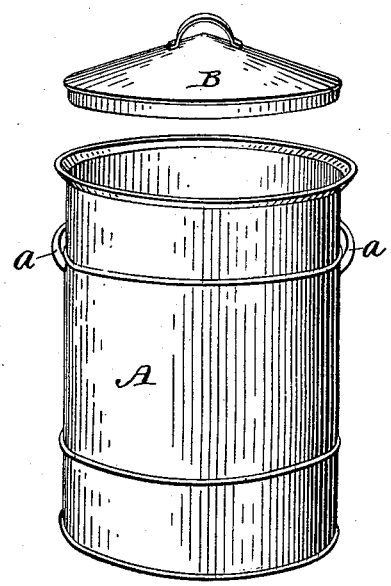
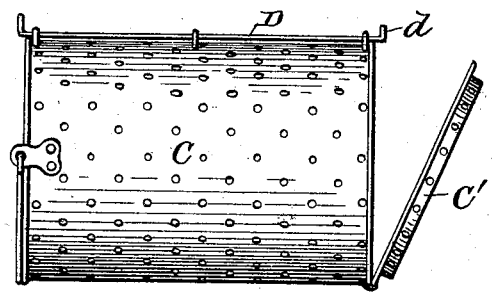
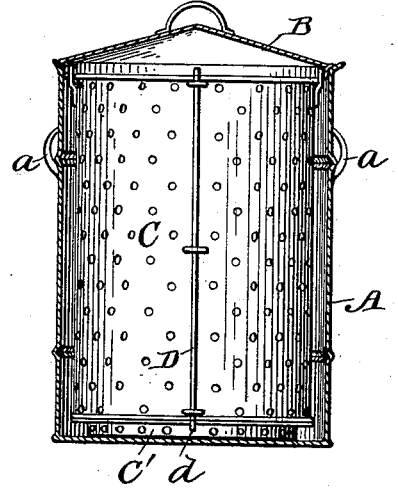
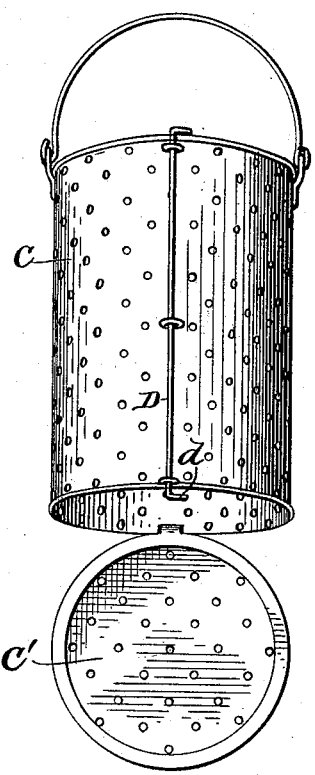
Witnesses
Inventor
Charles Baumgardner
his Attorney

UNITED STATES PATENT OFFICE.

CHARLES BAUMGARDNER, OF FREMONT, OHIO.

COOKING-VESSEL.

SPECIFICATION forming part of Letters Patent No. 532,226, dated January 8, 1895.

Application filed September 21, 1894. Serial No. 523,700. (No model.)

*To all whom it may concern:*

Be it known that I, CHARLES BAUMGARDNER, a citizen of the United States, residing at Fremont, in the county of Sandusky and State of Ohio, have invented certain new and useful Improvements in Cooking-Vessels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in cooking utensils, being an improved boiler or steamer for the preparation of food, and has for its objects the provision of an improved boiler or steamer consisting of the main or containing vessel and an inner perforated vessel having a hinged bottom.

The invention further consists in the combination and novel detail construction of the several parts hereinafter described, illustrated in the drawings, and more particularly pointed out in the claim hereunto appended.

Referring to the drawings, Figure 1 is a perspective view of the utensil with the top thereof slightly raised. Figs. 2 and 3 are views of the inside or perforated vessel, in different positions, showing the hinged bottom open, and latch therefor. Fig. 4 is a vertical sectional view of the outer or containing vessel showing the position of the inner or perforated vessel therein.

In the drawings similar letters of reference indicate corresponding parts in all the figures where they occur.

Referring to the drawings by letter, A represents the outer or containing vessel of the device, and $a$, $a$ are ears thereon for the attachment of a proper bail, and B indicates a cover for said vessel of any suitable construction.

C indicates the inner or perforated vessel, which is preferably, perforated throughout its entire surface, and is provided with a hinged perforated bottom C', as shown. This vessel is also provided with a suitable bail by means of which it is raised from, or lowered into the outer or containing vessel A.

D is a latch rod mounted on the outside of the inner or perforated vessel C, in suitable guides or brackets. The upper ends of this rod D project above the top of the perforated vessel C and is provided with a suitable handle, and its lower end extends to, or a little below the vertical wall of the vessel C, and is provided on its lower end with a hook $d$, that turns under the edge of the hinged bottom C' of the inner or perforated vessel C and holds it closed, as is apparent. To release the bottom the rod D is turned and the bottom will fall open and discharge the contents.

Having thus described my invention, what I claim, and desire to secure by Letters Patent of the United States, is—

A cooking utensil of the character described consisting of a vessel A, an inner perforated vessel C, a hinged perforated bottom C' therefor, and a latch rod D mounted in suitable bearings on the outside of the perforated vessel C, one end of said rod projecting above the top of said vessel C and provided with a suitable handle, and the lower end extending below the bottom thereof and provided with a hook $d$, as and for the purpose set forth.

In testimony whereof I affix my signature in presence of two witnesses.

CHARLES BAUMGARDNER.

Witnesses:
 THOMAS MCSHEEHY,
 JOHN KEEFE.